Sept. 13, 1966 W. O. WEBER 3,272,378
THERMOFORMED BOTTLE CASE
Filed Sept. 18, 1964 2 Sheets-Sheet 1
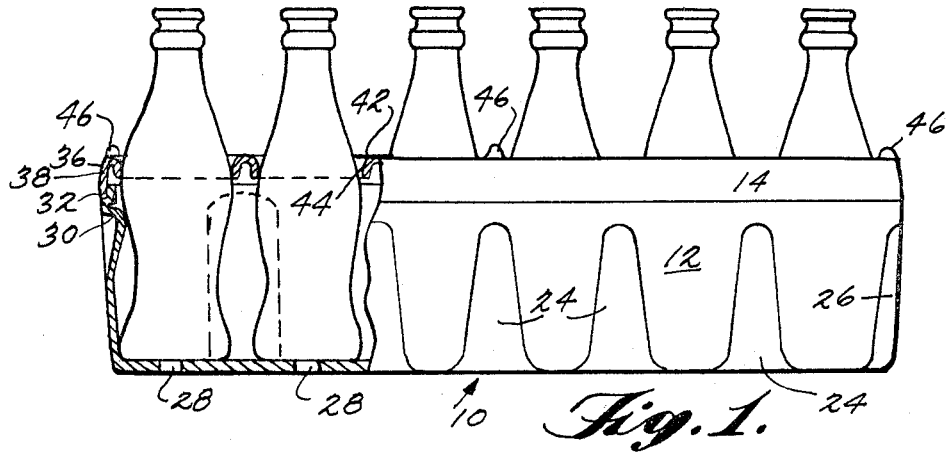
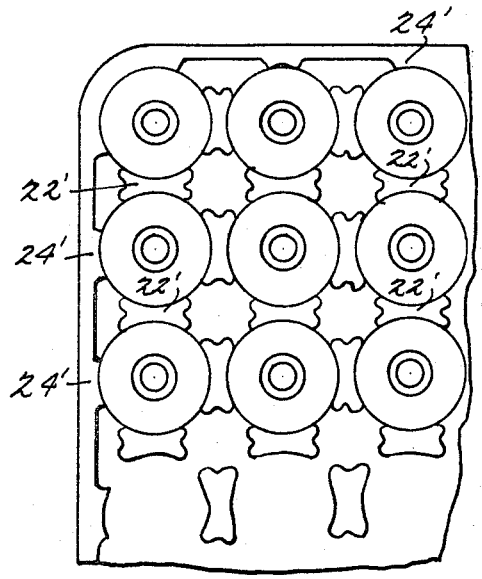
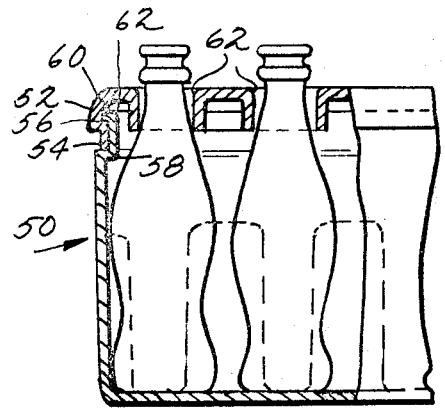
INVENTOR
WALTER O. WEBER
BY Cushman, Darby & Cushman
ATTORNEYS Sept. 13, 1966  W. O. WEBER  3,272,378

THERMOFORMED BOTTLE CASE

Filed Sept. 18, 1964  2 Sheets-Sheet 2

INVENTOR
WALTER O. WEBER

BY Cushman Darby & Cushman
ATTORNEYS

3,272,378
THERMOFORMED BOTTLE CASE
Walter O. Weber, Newark, Del., assignor, by mesne assignments, to Haveg Industries, Inc., Wilmington, Del., a corporation of Delaware
Filed Sept. 18, 1964, Ser. No. 397,478
11 Claims. (Cl. 220—21)

The present invention relates to cases for transporting and merchandizing bottled beverages and the like and more particularly to novel beverage cases which are thermally formed from thermoplastic material as upper and lower joinable sections.

Increasingly, beverage bottlers are becoming interested in beverage cases made from materials other than wood and fiberboard inasmuch as although the initial cost of cases made from these conventional materials is quite low, for instance about $.90 to $1.10 per 24 bottle case, the cost of annual repair is relatively high, usually equalling the initial cost of the case over its lifetime. Additionally, such cases are not only relatively bulky and heavy, thus causing high transportation cost and limiting the quantities of bottles transportable, but also the exteriors of new wooden and fiberboard bottle cases become scarred and dented quite quickly so that such cases are somewhat unsightly over a major portion of the period that they are still mechanically sound. Beside unsightliness, these cases when in such condition are quite susceptible of injuring persons who contact them, for instance by inflicting slivers from cracked wood portions and cuts from loosened metal edge and corner reinforcing bands.

Additional shortcomings such as the quickness with which trademarks and logos become obscured on such cases, their drabness and lack of sales appeal during major portions of the period of their mechanical usefulness and the difficulty of cleaning such cases and keeping them in sufficient repair that they do not present too great a hazard to personnel, bottling-line equipment and to the bottles themselves, have caused bottlers to look to such diverse materials as metals and plastics for more advantageously usable bottle cases.

Use of such materials for the manufacture of bottle cases has markedly increased of late, however, the heretofore proposed constructions employing metals and plastics have failed to achieve the proportion of the market that would at first seem achievable in view of their physical properties and generally more attractive appearance.

Primary factors that have previously prevented a greater usage include the substantially higher first cost of cases produced of such materials and the increased likelihood that such cases will be pilfered by customers for use as storage boxes, laundry carriers and such like.

To a large extent the cost of producing bottle cases from plastic material is greater because of the high cost of molds for compression, injection and blow molding and the number of separate secondary forming operations such as shearing, punching, trimming required. Additionally, molding of suitable cases that take full advantage of the properties of moldable plastic materials has been difficult because of deep undercuts and double re-entrant surfaces that would be encountered in producing a unitary case. To some extent the cost of such cases has been forced to remain at a high level because of the amount of plastic material heretofore required to produce sufficiently rugged and durable cases.

Accordingly it is a primary object of the present invention to provide a low cost, heavy duty carrying case for soft drink bottles or the like which effectively overcomes the disadvantages of prior art cases as outlined hereinabove.

More specifically it is an object of the invention to provide a thermoformed bottle carrying case formed from plastic material and comprising upper and lower joinable sections, each being convoluted and otherwise configured to substantially limit the freedom of movement of bottles received in the case to that necessary for inserting and withdrawing the bottles.

Another object of the invention is to produce bottle cases of the type described, which are more easily cleanable than prior art cases, are nestable when empty so as to facilitate the transport of a greater number of empty cases in the space available and which include a minimum of material consistent with the possession of sufficient ruggedness.

A further object of the invention is to provide bottle cases of the type described which are susceptible of being formed on continuous, automated vacuum-thermoforming apparatus having extremely short cycle times and operating on continuous sheets of plastic material utilizing relatively light weight, inexpensive molds and in a preferred embodiment of the invention it is an important object of the invention to produce rugged, yet extremely lightweight, bottle cases from foam plastic material having a tough, smooth skin and a high strength to weight ratio.

These and further objects of the invention will become more clearly apparent in the course of the following detailed discussion of preferred embodiments of the invention wherein specific reference is made to the attached drawing in which such embodiments are illustrated.

In the drawings:

FIGURE 1 is a side elevation view of a bottle case embodying principles of the present invention;

FIGURE 4 is a fragmentary side elevation view mostly sectioned to show a modified, disassociable means for securing the bottle case sections to one another; and FIGURE 5 is a fragmentary top plan view of a modified bottle case bottom section.

Figure 3:
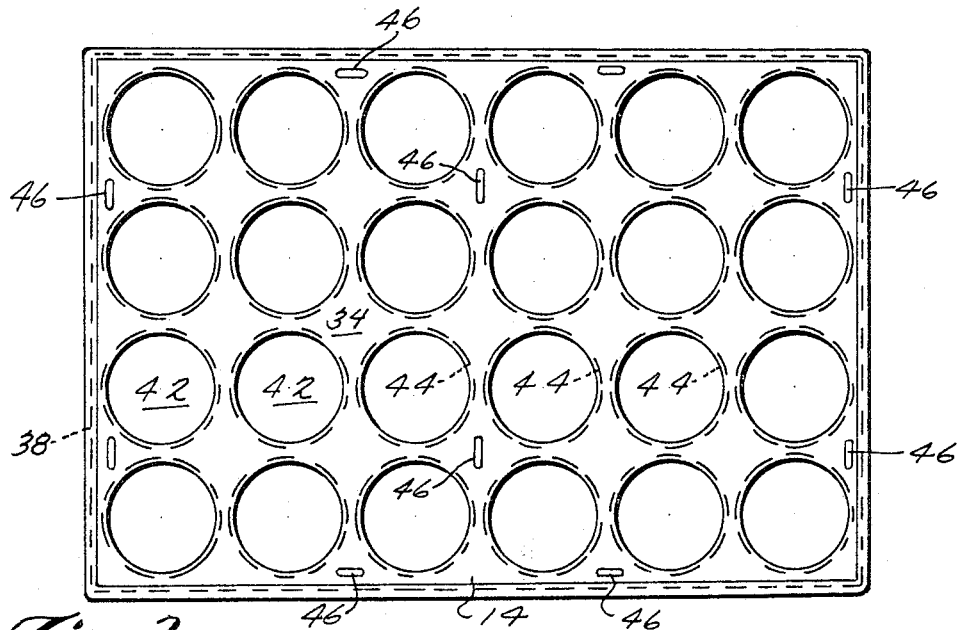
FIGURE 3 is a top plan view of the bottle case top section.

The bottle case 10 is preferably comprised of a bottom section 12 joined to a top section 14. The bottom section is generally rectangular in plan, each edge and corner thereof being generally smoothly rounded. As best seen in FIGURE 1, each of the sidewalls 16, 18 of the bottom section extends generally upwardly and outwardly from the bottom wall 20 so that the bottom section is generally frusto-pyramidal and is thus relatively deeply restable with similar sections, for instance for shipment.

As will be more completely explained hereinafter, the bottom sections are preferably substantially completely formed in a deep drawing vacuum thermoforming operation employing such apparatus and processes as are exemplified by the commonly assigned, copending application Serial No. 176,148 filed February 27, 1962, and in the Knowles Patent 3,027,596.

The bottom section 12 of the case as shown in FIGURE 1 includes a plurality of spaced, generally upwardly directed dome-like or rounded cone-like projections 22, 24, 26 formed by drawing of the plastic sheet from which the section is made against upwardly directed projections in the mold or die. These projections are so spaced so that each group of four adjacent projections define among them a bottle position. The case illustrated is configured to receive 24 soft-drink bottles in a 4 by 6 arrangement although it is within the purview of the invention that the projections could be positioned to receive other beverage and like bottles and similarly configured articles using the same or similar arrays.

As disclosed each projection 22 has its base peripherally completely surrounded by the bottom wall 20, each of the projections 24 merges at its base into the bottom wall 20 and at the remainder of the peripheral extent thereof into a sidewall 16 or 18 of the bottom section. The four projections 26 are each positioned at a juncture of the sidewalls 16 and 18 and the bottom wall 20 and peripherally merge into each of said walls 16, 18 and 20.

Figure 2:
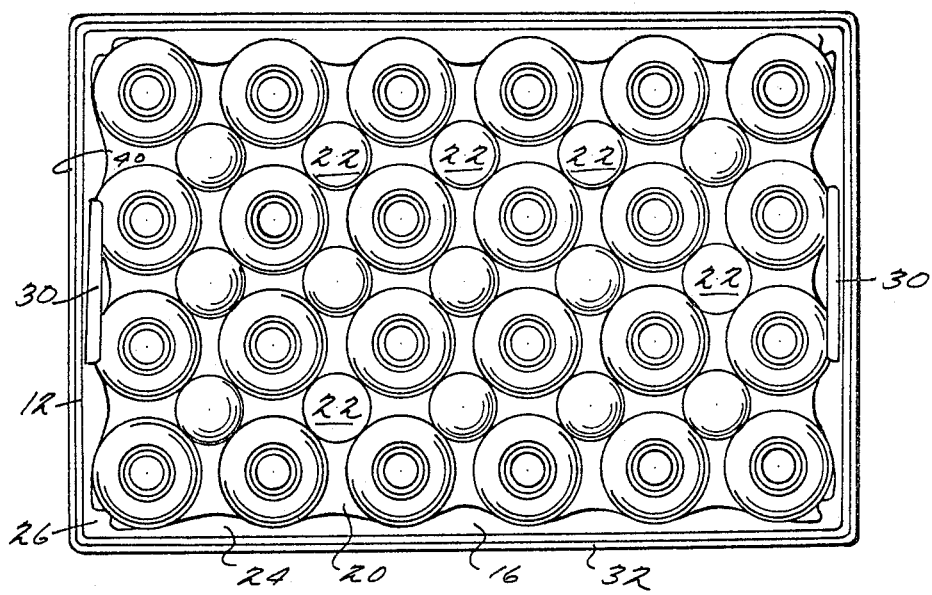
FIGURE 2 is a top plan view of the bottle case bottom section.

In the embodiment of FIGURES 1 and 2 the projections 22, are arranged with respect to the bottom 20 so that each projection has its longitudinal axis lying centrally among the four bottle positions located surrounding it. Similarly each projection 24 is disposed centrally between the two bottle positions immediately adjacent it.

In the modification shown in FIGURE 5, each of the projections 22' is located at the closest approach of each bottle position to an adjacent bottle position and the projections 24' are each positioned at the closest approach of each of the peripheral bottle positions to the periphery of the case. In other words, the rectangular pattern of the closest approach to the bottle positions of the projections of the embodiment of FIGURES 1 and 2 is offset 45 degrees from that of the modification shown in FIGURE 5.

Beside the modifications shown, the projections may be configured so as to laterally merge with one another defining individual wells within which bottles are received.

A slot or hole 28 is preferably punched, thermoformed or otherwise formed through the bottom 20 or 20' centrally of each bottom position. During use of the case as a bottle transporter moisture, such as that which may condense on the bottles, and rain or moisture from other forms of precipitation which makes its way into the case for instance, while bottles are being transported on an open truck, can drain the case bottom section through the holes 28. Additionally, when the case has been returned to the bottling establishment, the holes 28 facilitate washing of the case bottom section.

As apparent in FIGURES 1 and 2 the case 10 preferably includes handholds 30 integrally formed as inwardly directed deflections in the bottom section side walls 18.

The region adjacent the upper extent of the sidewall 16, 18 is configured to define a relatively narrow continuous upwardly and slightly inwardly directed flange 32. As will be further described hereinafter the flange 32 comprises the means for associating the case top section 14 with the bottom section 12.

The case top section 14 is also preferably substantially completely formed from thermoplastic sheet material in a deep drawing vacuum thermoforming operation, utilizing such apparatus and processes as are exemplified by the commonly assigned, copending application Serial No. 176,148, filed February 27, 1962, and in the Knowles Patent 3,027,596.

The case top section 14 as illustrated in FIGURES 1 and 3 is also generally rectangular in plan and is preferably generally frusto-pyramidal so that when separated from the case bottom sections, case top sections are restable for convenient shipment and storage. The top section top wall 34 comprises the major portion of the section, the side walls 36 thereof being relatively narrow so as to define a downwardly and outwardly directed continuous narrow flange having inner surface 38 complementarily configured with the outer surface 40 of the bottom section flange 32. The surfaces 38 and 40 can be bonded or otherwise temporarily or permanently joined as by heat welding, solvent welding, ultrasonic welding or the like to form a unitary case from the two sections.

In the embodiment depicted in FIGURES 1 and 3 the top section top wall 34 has a plurality of generally circular openings 42 formed therethrough and arranged so that each is centered over a bottle position as discussed hereinabove in regard to the case bottom section.

The top section top wall 34, as depicted in FIGURE 1, includes smoothly downwardly curving skirts 44 peripherally surrounding each opening 42 to facilitate insertion of bottles in the case, for instance by automatic machinery on a bottling line. The skirts 44 and openings 42 are preferably formed as a portion of the thermoforming operation, for instance by squeezing the area of the plastic sheet from which the top section is being formed peripherally of the intended openings utilizing cooperatively configured annular heated dies such as are disclosed in the above-mentioned commonly assigned application. Alternately, the openings can be sheared, punched or otherwise formed through the top wall.

A plurality of stacking nubs 46 are also thermoformed into the top wall 34. Each nub 46 is positioned so as to be received in the well defined beneath each of the projections 22, 24, 26 of a similar bottle case 10 placed thereon when the cases are assembled, yet empty. It should be recognized that the shapes of the projections and nubs shown are exemplary and may be modified somewhat without departing from the principles of the invention.

In FIGURE 4, a modified case 50 is shown, this case being the same in all respects to case 10 but for the two hereinafter discussed modifications.

The depending skirt 52 on the case top portion includes an indented section 54 adjacent its lower extent thereby defining an interior upwardly facing shoulder 56. The upwardly directed flange 58 on the case bottom portion includes an outwardly offset section 60 adjacent its upper extent thereby defining a downwardly facing shoulder 62. Accordingly, the upper and lower sections of the case 50 are removably joined by simply snapping the skirt indented section 54 past the flange offset section 60.

Utilizing a case having this modification, the bottler can more easily cleanse the interior of the case portions and can store cases in a much smaller area by nesting-like case portions.

The case 50 may also have smaller diameter openings 62, each configured to surround the neck portion of bottles placed in the case. Accordingly, the bottles are positively retained in the case until the case top portion is removed.

Because the bottom case portion in the novel cases shown provide a major portion of the support for the bottles and the upper portion to a substantial extent serves only to steady the bottles to prevent tilting and maintain the desired spacing between their neck portions, the top portion of the case can be fabricated from a thinner or less dense sheet of plastic material thus affording a considerably important saving, both in orginal cost of the cases produced and in the shipping cost of the cases over their lifetime.

The sheet material utilized to produce both the top and bottom case portions disclosed herein are preferably skinned foam plastic sheets having a smooth substantially non-porous external skin wherein the skin has a tensile strength commensurate with the compressive strength of the foam so that the composite sandwich truly acts as a structural unit with a relatively high flexural strength. Such skinned foams which are preferably employed because of their ability to be thermoformed without rupture are fully described in the commonly assigned, copending application Serial No. 305,275, filed August 29, 1963, whose disclosure including the examples therein is now incorporated herein by reference.

Of the thermoplastic polymer and copolymer compositions and mixtures disclosed therein, polystyrene polymerized mixtures of styrene and butadiene containing at least 70 percent by weight of styrene and homopolymers and interpolymers of monomeric compounds containing the $CH_2{=}C{<}$ grouping such as olefins, e.g., ethylene and propylene have been found to be most economically advantageously usable, although this compendium is not intended to exclude others of the compositions disclosed in the said application. In some instances cases as disclosed herein may in whole or in part be formed from non-foamed plastic material of the just-mentioned compositions and the invention is intended to include such cases. It should of course be realized that the case top and bottom portions need not be composed of the same plastic material.

Inasmuch as the case in its preferred form is composed of foam material possessing a high strength to weight ratio the cases produced according to the present invention can be either much lighter than prior art cases formed from as small an amount of material as is possible with those constructions, or can be considerably stronger than those constructions without weighing more than those cases.

In thermoforming the cases of the invention on automatic substantially continuously operating machinery, foam plastic sheet having a substantially uniform thickness is drawn over warmed molds or dies to which vacuum is communicated thus pulling the warmed sheet into intimate contact with the mold or die surfaces. When the required deformation of the sheet is great, for instance in forming the bottom portion of the case, the pulling of the sheet into contact with the mold or die may be advantageously assisted by plugs or cooperating mold portions engageable with the opposite side of the sheet from the mold or die and reciprocable toward and away from the deep portions of the mold or die. Severing of the case portions from the sheet as well as the formation of the bottom openings can be advantageously formed during or slightly succeeding the thermoforming operation for instance by squeezing the plastic sheet peripherally of the intended severing lines between cooperatively configured heated elements. The completed case portions can then be severed from the molds or dies by blasts of pressurized fluid. The dies or molds can be carried in any suitable manner, such as in successive flat sections on a revolving drum each section having the width or length of a case portion or on a flat moving or stationary table, although in the last-mentioned instance the case portion production would be semi-continuous utilizing sheets of definite length rather than being substantially continuously and employing sheet material of indeterminate length. Cycle times for the complete production of bottle case portions by thermoforming on continuously operating apparatus of 5–30 seconds, compared with cycle times of 60–120 seconds for blow molding similar articles points up the advantage provided by thermoforming.

It should now be apparent that the case constructed according to the present invention as just discussed requires far fewer fabrication steps than prior art cases, can be substantially lighter thus effecting a saving in initial cost and transporting cost, can have top and bottom sections of different thickness due to the difference in strength required and can have top and bottom sections of contrasting molded in colors, for instance to match the predominate colors of the trademark of the beverage to be carried in the cases. Additionally the logo of the beverage or bottler and other identifying information can easily be molded in the bottom portion side walls and other parts of the case during the thermoforming operation by suitable mold or die mounted, removable pads carrying the desired information in relief in reverse.

Because in one modification the case portions are removably joinable, the portions can be replaced independently of one another should one portion of the case become damaged.

It should now be apparent that the beverage case described herein effectively accomplishes each of the objects of the invention and that the illustrative embodiments shown and described well illustrate the principles of the invention. Inasmuch as the embodiments shown and described can be modified to a certain extent without departing from these principles the invention should be understood as encompassing all such modifications as fall within the spirit and scope of the following claims.

I claim:
1. A bottle case comprising a one-piece bottom portion including a bottom wall peripherally surrounded by relatively high upstanding side walls joined thereto, means for positioning bottles in the case, said positioning means comprising projections integrally extending from said bottom wall and said side walls and a one-piece top portion including a top wall and a relatively short depending skirt peripherally joined thereto, means defining a plurality of openings through said top wall arranged to peripherally engage bottles received in the case, means on said skirt adjacent the lower extent thereof and means on said side walls adjacent the upper extent thereof for joining said bottom and top portions to one another, said bottom and top portions are each essentially composed of foamed thermoplastic sheet material having a smooth, substantially moisture impervious exterior skin of the same material integral therewith.

2. A bottle case as set forth in claim 1 wherein said top portion is composed of substantially thinner foamed thermoplastic sheet material than that of which said bottom portion is composed.

3. A bottle case as set forth in claim 1 wherein said portion joining means are permanently secured to one another.

4. A bottle case as set forth in claim 1 wherein said portion joining means comprise a snaplock whereby said portions may be selectively joined and separated.

5. A bottle case as set forth in claim 4 wherein said top wall openings are each of a size to peripherally engage bottle neck portions whereby said top portion must be separated from said bottom portion to insert and withdraw bottles from the case.

6. A bottle case as set forth in claim 1 wherein said bottom and top portions are vacuum thermoformed from foamed thermoplastic sheet material having a uniform thickness.

7. A bottle case as set forth in claim 1 further including integral handle means comprising a plurality of indentations in said bottom portion side walls.

8. A bottle case as set forth in claim 1 further comprising means defining a plurality of integral nub-like stacking facilitating projections on said case top wall, said stacking facilitating projections being arranged on said top wall for receipt in recesses defined in the case bottom portion exterior subjacent said bottle positioning projections.

9. A bottle case as set forth in claim 1 further comprising means defining a plurality of drain openings through said bottom portion bottom wall.

10. A bottle case as set forth in claim 1 wherein said bottom portion upstanding side walls are generally frusto-pyramidal whereby said bottom portion is nestable with like bottom portions.

11. A bottle case as set forth in claim 1 wherein said top portion depending skirt is generally frusto-pyramidal whereby said top portion is nestable with like bottom portions.

References Cited by the Examiner

UNITED STATES PATENTS

| | | | |
|---|---|---|---|
| 1,039,364 | 9/1912 | Clark. | |
| 2,552,641 | 5/1951 | Morrison | 220—9 |
| 2,778,524 | 1/1957 | Bock | 220—21 |
| 2,939,603 | 6/1960 | Young | 220—83 |
| 3,106,308 | 10/1963 | Kazimier | 220—21 |
| 3,199,708 | 8/1965 | Schlesinger | 220—21 |

FOREIGN PATENTS

| | | |
|---|---|---|
| 1,351,218 | 12/1963 | France. |
| 406,511 | 3/1934 | Great Britain. |

LOUIS G. MANCENE, *Primary Examiner.*

GEORGE E. LOWRANCE, *Examiner.*